(12) United States Patent
Kaiserauer et al.

(10) Patent No.: US 11,466,776 B2
(45) Date of Patent: Oct. 11, 2022

(54) CONTROL DEVICE AND METHOD FOR OPERATING A PARKING BRAKE DEVICE OF A VEHICLE

(71) Applicant: Robert Bosch GmbH, Stuttgart (DE)

(72) Inventors: Thomas Kaiserauer, Esslingen (DE); Ingo Drewe, Fehmarn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/052,602

(22) PCT Filed: Mar. 19, 2019

(86) PCT No.: PCT/EP2019/056831
§ 371 (c)(1),
(2) Date: Nov. 3, 2020

(87) PCT Pub. No.: WO2019/211038
PCT Pub. Date: Nov. 7, 2019

(65) Prior Publication Data
US 2021/0180692 A1    Jun. 17, 2021

(30) Foreign Application Priority Data

May 3, 2018   (DE) ...................... 10 2018 206 824.0

(51) Int. Cl.
*F16H 63/48*   (2006.01)
*B60T 1/00*    (2006.01)
*F16H 63/34*   (2006.01)

(52) U.S. Cl.
CPC ............ *F16H 63/483* (2013.01); *B60T 1/005* (2013.01); *F16H 63/3425* (2013.01); *F16H 63/3491* (2013.01); *B60T 2270/414* (2013.01)

(58) Field of Classification Search
CPC .. F16H 63/48; F16H 63/3425; F16H 63/3491; B60T 1/005; B60T 1/0062; B60T 2270/141
See application file for complete search history.

(56) References Cited

U.S. PATENT DOCUMENTS 9,777,836 B1 * 10/2017 Lee ...................... F16H 63/3433
2002/0170800 A1 * 11/2002 Nagasaka ........... F16H 63/3491
192/219.6

(Continued)

FOREIGN PATENT DOCUMENTS

| CN | 101511652 A | 8/2009 |
| CN | 102348583 A | 2/2012 |

(Continued)

OTHER PUBLICATIONS

International Search Report for Application No. PCT/EP2019/056831 dated Jul. 15, 2019 (English Translation, 2 pages).

*Primary Examiner* — David R Morris
*Assistant Examiner* — Lori Wu
(74) *Attorney, Agent, or Firm* — Michael Best & Friedrich LLP

(57) ABSTRACT

A control device (10) for a parking brake device has an electronic device (12) by means of which, in the event of failure of a power supply system of a vehicle equipped with the control device (10) and the parking brake device during a procedure for parking the vehicle, at least one activation signal (14) can be output to a triggering device (16) of the parking brake device, so that the triggering device (16) can be activated by means of the at least one activation signal (14) and the parking brake device can be transferred to a locking mode by means of the activated triggering device (16), such that the vehicle is locked in its current parking position by means of the parking brake device present in its locking mode.

18 Claims, 3 Drawing Sheets

(56) References Cited

U.S. PATENT DOCUMENTS

| | | | |
|---|---|---|---|
| 2008/0302628 A1* | 12/2008 | Kimura | F16H 63/3458 |
| | | | 192/220 |
| 2017/0268672 A1 | 9/2017 | Mukai et al. | |
| 2017/0268673 A1 | 9/2017 | Ishikawa et al. | |
| 2018/0149267 A1* | 5/2018 | Newman | F16H 63/3441 |

FOREIGN PATENT DOCUMENTS

| | | |
|---|---|---|
| CN | 202641685 U | 1/2013 |
| CN | 103671905 A | 3/2014 |
| CN | 107010036 A | 8/2017 |
| DE | 102014207997 | 10/2015 |
| DE | 102015202337 | 8/2016 |
| JP | 2016217479 A | 12/2016 |
| JP | 2018040396 A | 3/2018 |

* cited by examiner

CONTROL DEVICE AND METHOD FOR OPERATING A PARKING BRAKE DEVICE OF A VEHICLE

BACKGROUND OF THE INVENTION

The invention concerns a control device for a parking brake device. Similarly, the invention concerns parking brake devices for vehicles. Furthermore, the invention concerns a method for the operation of a parking brake device of a vehicle.

DE 10 2014 207 997 A1 describes a control unit for a parking lock which is designed to activate a parking lock actuator of the parking lock in the event of a shift lever or brake pedal being operated by a driver of the vehicle equipped with the parking lock in such a way that by swiveling a parking lock pawl the parking lock actuator brings it into shape-locking engagement with a parking lock wheel of the parking lock.

SUMMARY OF THE INVENTION

The present invention creates a control device for a parking brake device, a parking brake device for a vehicle, and a method for operating a parking brake device of a vehicle.

The present invention creates possibilities for the reliable locking of a vehicle/motor vehicle in its current parking position in the event of an unexpected/sudden failure of a power supply system of the respective vehicle during an operation for shutting down/parking the vehicle. This ensures safe parking of the vehicle with a minimized risk of rolling away (of almost zero) even in such a situation. Even if the already initiated operation for shutting down/parking the vehicle could not be completed due to the failure of the vehicle's power supply system, no rolling away of the vehicle need be feared when using the present invention. In particular, when using the present invention, rolling away of the vehicle need not be feared even if the driver present in the vehicle forgets to operate the brakes at the time of failure of the power supply system. The present invention thus increases driver comfort and a safety standard of the vehicle used for its implementation.

It is also pointed out that the present invention additionally creates possibilities for the safe shutting down/parking of an autonomous vehicle in the event of a failure of its power supply system, although in this case no driver is present. The present invention thus also contributes to the increase of a safety standard of autonomously driving vehicles.

In an advantageous embodiment, the control device comprises an emergency energy storage device, and the electronic device is designed to output energy stored in the emergency energy storage device as the at least one activation signal to the triggering device of the parking brake device. Since sufficient energy for activating the triggering device can usually be stored by means of a comparatively cost-effective emergency energy storage device requiring little installation space, such as a storage capacitor, such a design of the control system hardly leads to an increase the installation space requirement or costs. At the same time, in this embodiment of the control device, it is clear that despite an unexpected/sudden failure of the power supply system of the respective vehicle there is still sufficient energy to change the parking brake device into its locking mode.

In an alternative embodiment of the control device, the electronic device may be designed to output at least one switching signal as the at least one activation signal to at least one switch of the triggering device, so that the electronics of the triggering device can be supplied with current from an energy storage device of the triggering device by means of the switch switched by means of the at least one switching signal. Also in this case, an adequate energy supply of the triggering device for reliably changing the parking brake device into its locking mode is guaranteed.

The advantages described above of the embodiments of the control device are also guaranteed in the case of a parking brake device for a vehicle for interaction with such a control device or in the case of a parking brake device for a vehicle with a corresponding control device. In both cases, the parking brake device comprises the triggering device, which is activated by means of at least one activation signal output by the control device, wherein the parking brake device is designed in such a way that the parking brake device can be changed to its locking mode by means of the activated triggering device, so that the vehicle can be locked in its current parking position by means of the parking brake device which is in its locking mode.

Preferably, the parking brake device has as its triggering device a pyrotechnic or electromagnetic triggering device and an adjustment element, wherein the adjustment element can be changed by means of activation of the pyrotechnic or electromagnetic triggering device from its starting position to an active position in such a way that the parking brake device is in its locking mode when the adjustment element is in its active position. The design described here of the parking brake device with the pyrotechnic or electromagnetic triggering device and the adjustment element ensures that even a comparatively small amount of energy is sufficient for changing the parking brake device into its locking mode.

For example, the parking brake device may comprise a movable pawl, a locking wheel and at least one spring, wherein the movable pawl can be held in a waiting position spaced apart from the locking wheel by means of the adjustment element in its starting position against a force of the at least one spring, and wherein the movable pawl, when the adjustment element is in its active position, can be pressed against the locking wheel in a locking position by means of the force of the at least one spring in such a way that the parking brake device is in its locking mode. The interaction of the movable pawl, the locking wheel, which has at least one spring, and the adjustment element described here can be designed to be mechanically easy and cost-effective.

Alternatively, the parking brake device may also include a movable pawl and a locking wheel, wherein the movable pawl is in a waiting position spaced apart from the locking wheel when the adjustment element is in its starting position, and wherein the movable pawl is pressed against the locking wheel in a locking position by means of the adjustment element in its active position in such a way that the parking brake device is in its locking mode. This embodiment of the parking brake device is also comparatively simple and cost-effective.

The parking brake may be, for example, a parking lock or an electric parking brake. The present invention can therefore be used for a variety of advantageously used vehicle components to suppress undesired rolling away of the respective vehicle equipped with it. It should be noted, however, that the examples given here for the parking brake device are not to be understood as limiting.

Furthermore, an implementation of a corresponding method for operating a parking brake device of a vehicle provides the already mentioned advantages. It is expressly noted that the method for operating a parking brake device of a vehicle in accordance with the embodiments described above of the control device and the parking brake devices can be developed further.

BRIEF DESCRIPTION OF THE DRAWINGS

Further features and advantages of the present invention are described below on the basis of the figures. In the figures.

DETAILED DESCRIPTION

Figure 1:
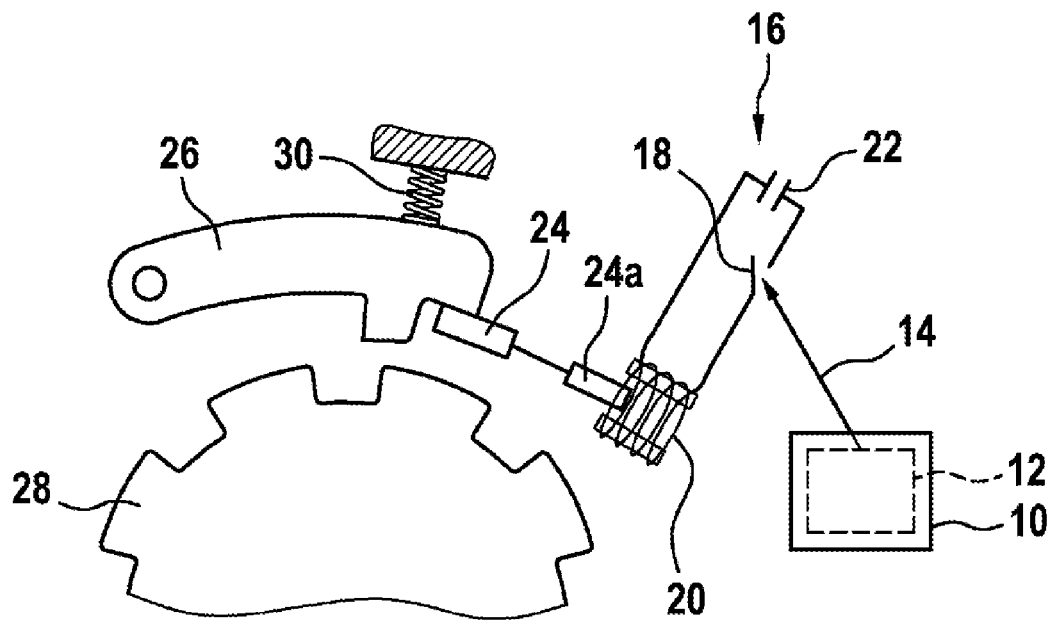
FIG. 1 shows a schematic representation of a first embodiment of the control device, or a first embodiment of a parking brake device interacting with or equipped with it.

FIG. 1 shows a schematic representation of a first embodiment of the control device, or a first embodiment of a parking brake device interacting with or equipped with it.

The control device 10 represented schematically in FIG. 1, or the parking brake device interacting with it or equipped with it, can be used in a variety of vehicle types/motor vehicle types. Even if the use of the control device 10 specifically for a vehicle/motor vehicle designed for autonomous driving is particularly advantageous, the control device 10 is nevertheless advantageously usable in any other type of vehicle/motor vehicle.

The control device 10 has an electronic device 12, by means of which a failure of a (not shown) power supply system of a vehicle equipped with the control device 10 and the parking brake device can be detected during an operation for shutting down/parking the vehicle. The failure of the power supply system of the respective vehicle can mean a failure of a low-voltage onboard network of the respective vehicle, for example. Since possibilities for recognizing such a situation are already known from the prior art, no further details are given here. For example, the electronic device 12 may detect by means of at least one voltage measuring device that a provided low voltage falls below a predetermined threshold value.

The electronic device 12 is designed, in the event of a failure of the power supply system during an operation for shutting down/parking the vehicle, to output at least one activation signal 14 to a triggering device 16 of the parking brake device such that the triggering device 16 can be/is activated by means of the at least one activation signal 14. For this purpose, the triggering device 16 is designed in such a way that the triggering device 16 can be/is activated by means of the at least one activation signal 14 output by the control device 10. Moreover, the parking brake device described in more detail below is designed in such a way that the parking brake device can be/is changed into a so-called locking mode by the activated triggering device 16. As is also described in more detail below, the design of the parking brake device ensures that the vehicle is locked/held in its current parking position by means of the parking brake device when this is in its locking mode. In this way, the control device 10 ensures that the vehicle is locked in its current parking position by means of the parking brake device in the event of a failure of its power supply system during an operation to shut down/park the vehicle.

The control device 10 and the parking brake device interacting or equipped with it thus ensure that even in the event of an unexpected/sudden failure of its power supply system during an operation for shutting down/parking the vehicle, the vehicle is/will be locked in the respective parking position in such a way that undesired rolling away of the vehicle need not be feared even on a parking surface with a significant slope. Due to the advantageous design of the control device 10, this advantage is also guaranteed if the failure of the power supply system occurs during an operation for shutting down/parking the previously autonomously driving and driverless vehicle. In contrast, even in the event of discharging of a low-voltage onboard network being used as a power supply system of the already parked vehicle, activation of the triggering device 16 need not be feared, and thus no undesired movement of the parking brake device into its locking mode. Instead, in such a situation the vehicle can be secured by means of a conventional parking system, for example.

In the embodiment of FIG. 1, the electronic device 12 of the control device 10 is designed to output at least one switching signal 14 as the at least one activation signal 14 to at least one switch 18 of the triggering device 16, whereby the electronics 20 of the triggering device 16 are/can be supplied with electricity from a (dedicated) energy storage device 22 of the triggering device 16 via the switch 18 switched by means of the at least one switching signal 14. Thus, even in the event of a failure of the power supply system, an adequate power supply is still provided for activating the triggering device 16 and for changing the parking brake device into its locking mode. For example, at least one storage capacitor 22 can be used as the energy storage device 22 of the triggering device 16. Such an energy storage device 22 is comparatively cost-effective and requires relatively little installation space. The at least one storage capacitor 22 can be charged at each start of a vehicle's journey from its power supply network with sufficient triggering energy for triggering the triggering device 16. Also, the low-voltage onboard network is well suited to this purpose. It is noted, however, that the storage capacitor 22 shown in FIG. 1 is to be interpreted only as an example of the energy storage device 22 of the triggering device 16. Other types of energy storage can also be used for the triggering device 16.

As an alternative to the design of the triggering device 16 with its own energy storage device 22, the control device 10 may also include an emergency energy storage device (not sketched). In this case, the electronic device 12 is preferably designed to output energy stored in the emergency energy storage device as the at least one activation signal 14 to the triggering device 16 of the parking brake device. In this way, too, it can be ensured that, especially in the event of a failure of the vehicle's power supply system during an operation for shutting down the vehicle, there is still an adequate power supply of the triggering device 16 to activate the triggering device 16 and to change the parking brake device into its locking mode.

In the embodiment of FIG. 1, the triggering device 16 is an electromagnetic triggering device 16 with a solenoid coil 20 as at least part of its electronics 20. A magnetic field can be/is produced by energizing the solenoid coil 20. Moreover, the parking brake device schematically reproduced in FIG. 1 has an adjustment element 24, wherein the adjustment element 24 is arranged on the triggering device 16 such that the adjustment element 24 may be/is adjusted from a starting position (shown in FIG. 1) into an active position by activation of the triggering device 16. In the figuratively reproduced embodiment of FIG. 1, the adjustment element 24 can be pulled from its starting position into its active position by means of the magnetic field generated by energizing the solenoid coil 20. In particular, in its active position the adjustment element can 24 protrude at least partially into a volume surrounded by the solenoid coil 20. If desired, at least a part 24a of the adjustment element 24 can be magnetized. Moreover, the parking brake device is designed in such a way that the parking brake device is in its locking mode if the adjustment element 24 is in its active position.

In the example of FIG. 1, the parking brake device also includes a movable pawl 26, a locking wheel 28 and at least one spring 30. The at least one spring 30 can be at least one compression spring 30 and/or at least one tension spring. In particular, at least one pre-loaded spring 30 may be used as the at least one spring 30. The movable pawl 26 is/may be held in a waiting position spaced apart from the locking wheel 28 against a force of the at least one spring 30 by means of the adjustment element 24 in its starting position. The adjustment element 24 thus functions as a so-called "holding element". If the adjustment element 24 is in its active position, however, the movable pawl 26 is/will be forced into a locking position against the locking wheel 28 by the force of the at least one spring 30, such that the parking brake device is in its locking mode. Also, the at least one spring 30 can thus be used as a "force storage device" so as to cause form-fitting locking of the movable pawl 26 in its locking position on the locking wheel 28 in the event of a failure of the power supply system of the vehicle.

After the parking brake device of FIG. 1 has been changed to its locking mode by latching the movable pawl 26 on the locking wheel 28, the vehicle equipped with the parking brake device is no longer ready to drive. Rolling away of the vehicle need not be feared before releasing the movable pawl 26 from the locking wheel 28. Reactivation of the parking brake device by releasing the movable pawl 26 from the locking wheel 28 can be carried out by a workshop. Since the change of the parking brake device into its locking mode is carried out at relatively low frequency, the help of the workshop for the release of the movable pawl 26 from the locking wheel 28 is only comparatively rare.

Figure 2:
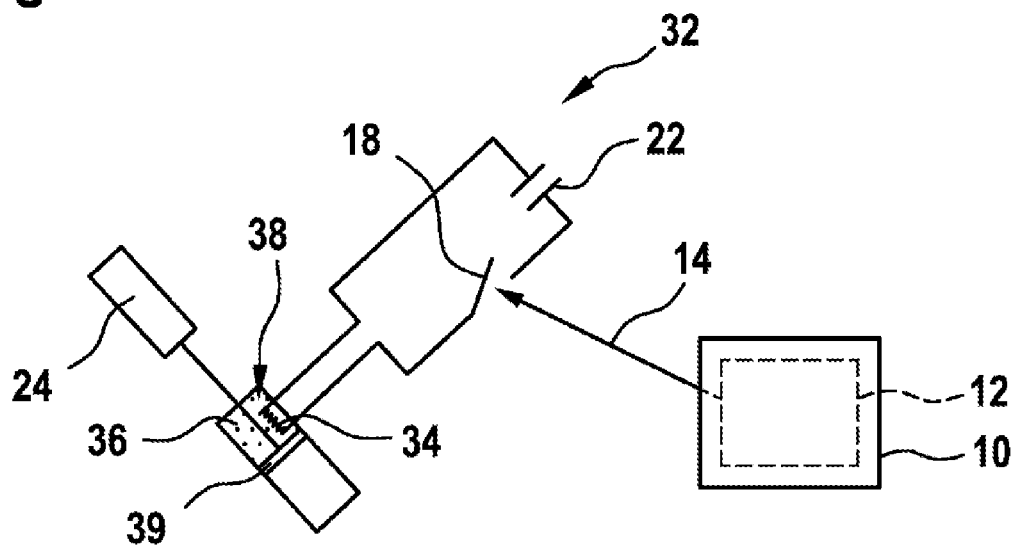
FIG. 2 shows a schematic representation of a second embodiment of the control device, or a second embodiment of a parking brake device interacting with or equipped with it.

FIG. 2 shows a schematic representation of a second embodiment of the control device, or a second embodiment of a parking brake device interacting with it or equipped with it.

The parking brake device partially schematically reproduced in FIG. 2 differs from the previously described embodiment in that the parking brake device of FIG. 2 has a pyrotechnic triggering device 32. The pyrotechnic triggering device 32 has a coil 34 as at least part of its electronics 34, wherein sparks/ignition sparks can be/are produced by energizing the coil 34. By means of the sparks generated in this way, an explosive material 36 which is present in a reaction volume 38 of the triggering device 32 can be caused to explode. The reaction volume 38 is limited by a movable piston 39, wherein an increase in pressure caused by means of the explosion of the explosive material 36 is sufficient to displace the movable piston 39.

With the parking brake device of FIG. 2, the adjustment element 24 already described above is connected to the movable piston 39 in such a way that the adjustment element 24 may be/is displaced by means of the displacement motion of the movable piston 39 from its starting position triggered by the explosion of the explosive material 36. Thus, the adjustment element 24 shown in FIG. 2 as a so-called "holding element" can also interact with the components 26 to 30 (not shown) of its parking brake device in such a way that a chain reaction for changing the parking brake device into its locking mode can be triggered by energization of the ignition coil 34. The force of the at least one spring 30 then causes reliable holding of the movable pawl 26 in its locking position, or reliable latching of the movable pawl 26 in a locking wheel opening of the locking wheel 28.

Regarding other components of the parking brake device of FIG. 2, reference is made to the embodiment described above.

Figure 3:
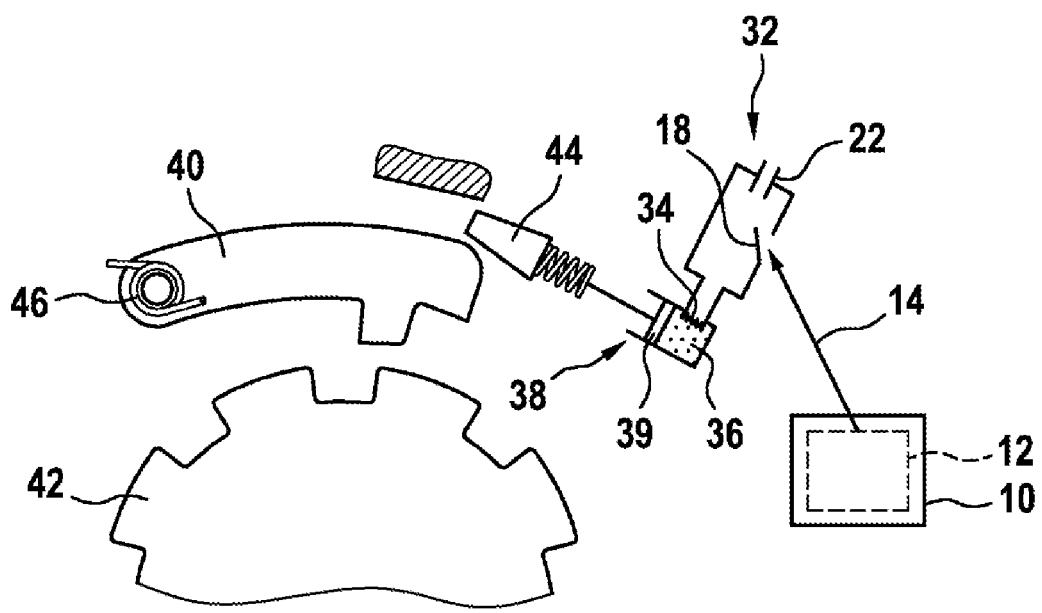
FIG. 3 shows a schematic representation of a third embodiment of the control device, or a third embodiment of a parking brake device interacting with or equipped with it.

FIG. 3 shows a schematic representation of a third embodiment of the control device, or a third embodiment of a parking brake device interacting with it or equipped with it.

The parking brake device shown schematically in FIG. 3 also has a movable pawl 40 and a locking wheel 42. If the adjustment element 44 designed as a "wedge element" is in its starting position, however, the movable pawl 40 is in a so-called waiting position spaced apart from the locking wheel 42. For example, as long as the adjustment element 44 is in its starting position, the movable pawl 40 can be held away from the locking wheel 42 by at least one spring 46, in particular such as at least one rotary spring 46. Preferably, in its starting position the adjustment element 44 does not contact the movable pawl.

Also in the parking brake device of FIG. 3, the adjustment element 44 is adjustable from its starting position into its active position by means of an explosion of the explosive material 36 filled in the reaction volume 38 due to the sparks generated by the ignition coil 34. The movable pawl 40 may be/is only forced into a locking position against the locking wheel 42 by means of the adjustment element 44 in its active position, so that the parking brake device is in its locking mode. For example, when displaced into its active position, the adjustment element 44 as a "wedge element" can contact the movable pawl 40 so that the movable pawl 40 is pressed against the locking wheel 42 against a force of the at least one spring 46. Once the movable pawl 40 lies above a locking wheel opening formed in the locking wheel 42, the movable pawl 40 is pushed into the locking wheel opening by the force exerted by the adjustment element 40 and latches onto the locking wheel 42.

Regarding other components of the parking brake device of FIG. 3, reference is made to the embodiments described above.

Figure 4:
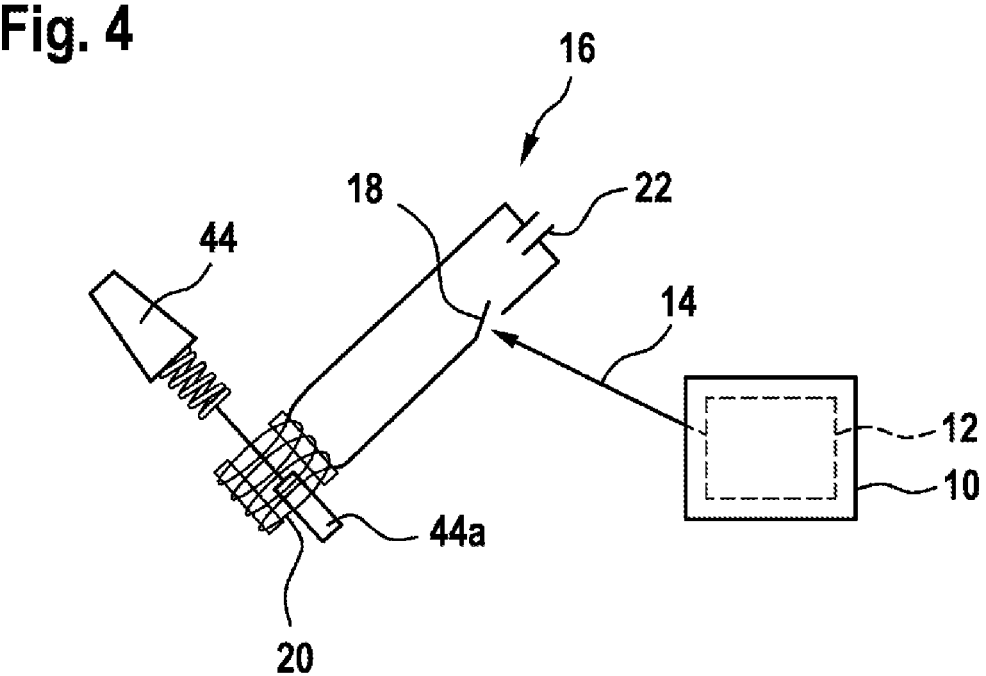
FIG. 4 shows a schematic representation of a fourth embodiment of the control device, or a fourth embodiment of a parking brake device interacting with or equipped with it.

FIG. 4 shows a schematic representation of a fourth embodiment of the control device, or a fourth embodiment of a parking brake device interacting with it or equipped with it.

In the embodiment of FIG. 4, the adjustment element 44 formed as a "wedge element" can be pulled from its starting position into its active position by the magnetic field generated by energization of the solenoid coil 20. In particular, in its active position the adjustment element 24 may at least partially protrude into an inner volume enclosed by the solenoid coil 20. Specifically, a part 44a of the adjustment element 44 may be magnetized.

By means of the adjustment element 44 in its active position, the movable pawl 40 (not shown) is/can be pushed into a locking position against the locking wheel 42 (not sketched) such that the movable pawl 40 is pushed into the locking wheel opening by means of the adjustment element 40 and is latched onto the locking wheel 42. Thus, the parking brake device of FIG. 4 also has the advantages of the previously described embodiments.

Further components of the parking brake device of FIG. 4 are already described with reference to the embodiments described above.

In all embodiments of the parking brake device described above, the control device 10 may be integrated into the respective parking brake device. However, the control device 10 may also be a component formed separately from the respective parking brake device, which interacts with the respective parking brake device.

In the embodiments of the parking brake device described above, the parking brake device is a parking lock in each case. In particular, in the case of the respective parking lock, the locking wheel 28 or 42 may be mounted on a gearbox of an internal combustion engine and/or an electric drive motor of the respective vehicle or on at least one wheel of the respective vehicle. In both cases, the vehicle can be reliably held even on a surface with a significant slope by means of latching of the movable pawl 26 or 40 on the assigned locking wheel 28 or 42. Alternatively, however, any of the parking brake devices described above may also be an electric parking brake.

Figure 5:
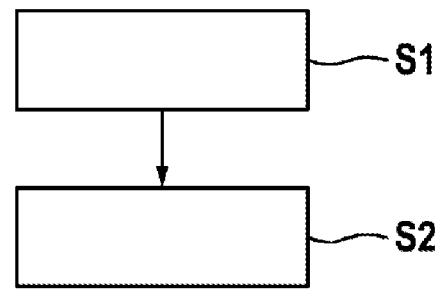
FIG. 5 shows a flowchart for describing an embodiment of the method for operating a parking brake device of a vehicle.

FIG. 5 shows a flowchart for the explanation of an embodiment of the method for operating a parking brake device of a vehicle.

As step S1 of the method, it is determined whether a power supply system of the vehicle fails during an operation for shutting down the vehicle. For example, step S1 of the method can be carried out repeatedly during an operation for shutting down the vehicle by continuously measuring a voltage that can be provided by the power supply system, such as a low voltage, by means of at least one voltage measuring device and comparing this with a predetermined threshold value.

If it is determined in step S1 of the method that the power supply system of the vehicle fails during an operation for shutting down the vehicle, for example because the measured voltage falls below the predetermined threshold value, a step S2 of the method is carried out. In step S2 of the method, a triggering device of the parking brake device is activated in such a way that the activated triggering device changes the parking brake device into a locking mode, so that the stationary vehicle is locked by means of the parking brake device which is in its locking mode.

In order to carry out the method described here, all the above-mentioned parking brake devices can be used. However, the implementability of the method shall not be limited to the use of any of these parking brake devices.

What is claimed is:

1. A control device (10) for a parking brake device, the control device comprising an electronic device (12) configured to detect a failure of a power supply system of a vehicle and, only in the event of the failure of the power supply system of the vehicle equipped with the control device (10) and failure of the parking brake device during an operation for shutting down the vehicle, output at least one activation signal (14) to a triggering device (16, 32) of the parking brake device in such a way that the triggering device (16, 32) is activated by the at least one activation signal (14) and the parking brake device is changed to a locking mode by the activated triggering device (16, 32), so that the vehicle is locked in a current parking position by the parking brake device which is in the locking mode.

2. The control device (10) as claimed in claim 1, wherein the control device (10) comprises an emergency energy storage device and the electronic device (12) is configured to output energy stored in the emergency energy storage device as the at least one activation signal to the triggering device (16, 32) of the parking brake device.

3. The control device (10) as claimed in claim 1, wherein the electronic device (12) is configured to output at least one switching signal (14) as the at least one activation signal (14) to at least one switch (18) of the triggering device (16, 32) in such a way that electronics (20, 34) of the triggering device (16, 32) can be supplied with energy from an energy storage device (22) of the triggering device (16, 32) via the switch (18) switched by the at least one switching signal (14).

4. A parking brake device for a vehicle for interacting with the control device (10) as claimed in claim 1, the parking brake device comprising:
the triggering device (16, 32), which is configured to be activated by the at least one activation signal (14) output by the control device (10);
wherein the parking brake device is configured such that the parking brake device can be changed into the locking mode by the activated triggering device (16, 32), so that the vehicle is locked in the current parking position by the parking brake device which is in the locking mode.

5. The parking brake device as claimed in claim 4, wherein the parking brake device has a pyrotechnic or electromagnetic triggering device (16, 32) as the triggering device (16, 32) and an adjustment element (24, 44), and wherein the adjustment element (24, 44) is arranged on the triggering device (16, 32) in such a way that the adjustment element (24, 44) can be displaced from a starting position to an active position by activation of the pyrotechnic or electromagnetic triggering device (16, 32) such that the parking brake device is in the locking mode when the adjustment element (24, 44) is in the active position.

6. The parking brake device as claimed in claim 5, wherein the parking brake device comprises a movable pawl (26), a locking wheel (28) and at least one spring (30), wherein the movable pawl (26) can be held in a waiting position spaced apart from the locking wheel (28) by the adjustment element in the starting position (24) and against the force of the at least one spring (30), and wherein the movable pawl (26) can be forced by the force of the at least one spring (30) into a locking position against the locking wheel (28) with the adjustment element (24) in the active position, so that the parking brake device is in the locking mode.

7. The parking brake device as claimed in claim 5, wherein the parking brake device comprises a movable pawl (40) and a locking wheel (42), wherein with the adjustment element (44) in the starting position the movable pawl (40) is in a waiting position spaced apart from the locking wheel (42) and wherein the movable pawl (40) can be forced into a locking position against the locking wheel (42) by the adjustment element (44) in the active position so that the parking brake device is in the locking mode.

8. The parking brake device as claimed in claim 4, wherein the parking brake device is a parking lock or an electric parking brake.

9. A parking brake device for a vehicle with:
the control device (10) as claimed in claim 1, and the triggering device (16, 32), which is configured to be activated by the at least one activation signal (14) output by the control device (10), wherein the parking brake device is configured such that the parking brake device can be changed into the locking mode by the activated triggering device (16, 32), so that the vehicle is locked in the current parking position by the parking brake device which is in the locking mode.

10. The parking brake device as claimed in claim 9, wherein the parking brake device has a pyrotechnic or electromagnetic triggering device (16, 32) as the triggering device (16, 32) and an adjustment element (24, 44), and wherein the adjustment element (24, 44) is arranged on the triggering device (16, 32) in such a way that the adjustment element (24, 44) can be displaced from a starting position to an active position by activation of the pyrotechnic or electromagnetic triggering device (16, 32) such that the parking brake device is in the locking mode when the adjustment element (24, 44) is in the active position.

11. The parking brake device as claimed in claim 10, wherein the parking brake device comprises a movable pawl (26), a locking wheel (28) and at least one spring (30), wherein the movable pawl (26) can be held in a waiting position spaced apart from the locking wheel (28) by the adjustment element in the starting position (24) and against the force of the at least one spring (30), and wherein the movable pawl (26) can be forced by the force of the at least one spring (30) into a locking position against the locking wheel (28) with the adjustment element (24) in the active position, so that the parking brake device is in the locking mode.

12. The parking brake device as claimed in claim 10, wherein the parking brake device comprises a movable pawl (40) and a locking wheel (42), wherein with the adjustment element (44) in the starting position the movable pawl (40) is in a waiting position spaced apart from the locking wheel (42) and wherein the movable pawl (40) can be forced into a locking position against the locking wheel (42) by the adjustment element (44) in the active position so that the parking brake device is in the locking mode.

13. The parking brake device as claimed in claim 9, wherein the parking brake device is a parking lock or an electric parking brake.

14. A vehicle comprising the control device (10) for a parking brake device as recited in claim 1.

15. A vehicle comprising the control device (10) as claimed in claim 1,
the vehicle further comprising a parking brake device for interacting with the control device (10), the parking brake device comprising:
the triggering device (16, 32), which is configured to be activated by the at least one activation signal (14) output by the control device (10);
wherein the parking brake device is configured such that the parking brake device can be changed into the locking mode by the activated triggering device (16, 32), so that the vehicle is locked in the current parking position by the parking brake device which is in the locking mode.

16. The control device (10) as claimed in claim 1, wherein the failure of the power supply system of the vehicle is detected by a voltage measuring device configured to detect that a provided voltage falls below a threshold value.

17. A method for operating a parking brake device of a vehicle, the method comprising the steps:
determining via a control device (10) whether a power supply system of the vehicle fails during an operation for shutting down the vehicle (S1); and,
when the power supply system of the vehicle has failed during an operation for shutting down the vehicle, activating, via the control device (10) only in response to the control device (10) determining that the power supply system of the vehicle has failed, a triggering device (16, 32) of the parking brake device in such a way that the activated triggering device (16, 32) changes the parking brake device into a locking mode, so that the stationary vehicle is locked (S2) by the parking brake device which is in the locking mode.

18. A parking brake device for a vehicle for interacting with a control device (10), the control device comprising an electronic device (12) configured to detect a failure of a power supply system of a vehicle and, in the event of the failure of the power supply system of the vehicle equipped with the control device (10) and failure of the parking brake device during an operation for shutting down the vehicle, output at least one activation signal (14) to a triggering device (16, 32) of the parking brake device in such a way that the triggering device (16, 32) is activated by the at least one activation signal (14) and the parking brake device is changed to a locking mode by the activated triggering device (16, 32), so that the vehicle is locked in a current parking position by the parking brake device which is in the locking mode,
the parking brake device comprising:
the triggering device (16, 32), which is configured to be activated by the at least one activation signal (14) output by the control device (10);
wherein the parking brake device is configured such that the parking brake device can be changed into the locking mode by the activated triggering device (16, 32), so that the vehicle is locked in the current parking position by the parking brake device which is in the locking mode,
wherein the parking brake device has a pyrotechnic triggering device (16, 32) as the triggering device (16, 32) and an adjustment element (24, 44), and wherein the adjustment element (24, 44) is arranged on the triggering device (16, 32) in such a way that the adjustment element (24, 44) can be displaced from a starting position to an active position by activation of the pyrotechnic triggering device (16, 32) such that the parking brake device is in the locking mode when the adjustment element (24, 44) is in the active position, and
wherein the parking brake device comprises a movable pawl (26), a locking wheel (28) and at least one spring (30), wherein the movable pawl (26) can be held in a waiting position spaced apart from the locking wheel (28) by the adjustment element in the starting position (24) and against the force of the at least one spring (30), and wherein the movable pawl (26) can be forced by the force of the at least one spring (30) into a locking position against the locking wheel (28) with the adjustment element (24) in the active position, so that the parking brake device is in the locking mode.

* * * * *